(12) United States Patent
Montuya

(10) Patent No.: US 11,216,027 B1
(45) Date of Patent: Jan. 4, 2022

(54) ROTATABLE DISPLAY SCREEN FOR A NOTEBOOK COMPUTER

(71) Applicant: Anthony R. Montuya, Signal Hill, CA (US)

(72) Inventor: Anthony R. Montuya, Signal Hill, CA (US)

( * ) Notice: Subject to any disclaimer, the term of this patent is extended or adjusted under 35 U.S.C. 154(b) by 0 days.

(21) Appl. No.: 16/533,877

(22) Filed: Aug. 7, 2019

Related U.S. Application Data

(60) Provisional application No. 62/715,603, filed on Aug. 7, 2018.

(51) Int. Cl.
*G06F 1/16* (2006.01)

(52) U.S. Cl.
CPC .......... *G06F 1/1616* (2013.01); *G06F 1/1654* (2013.01)

(58) Field of Classification Search
CPC .............................. G06F 1/1616; G06F 1/1654
See application file for complete search history.

(56) References Cited

U.S. PATENT DOCUMENTS

| | | |
|---|---|---|
| 6,262,885 B1 * | 7/2001 | Emma ................... G06F 1/1618 361/679.05 |
| D487,891 S | 3/2004 | Yang et al. |
| 6,847,520 B2 | 1/2005 | Hashimoto |
| D606,535 S | 12/2009 | Morooka et al. |
| D622,269 S | 8/2010 | Morooka et al. |
| 7,903,400 B1 * | 3/2011 | Chen ..................... G06F 1/1616 361/679.27 |
| 8,860,666 B2 | 10/2014 | Pan |
| D740,802 S | 10/2015 | Hsu et al. |
| 9,164,541 B2 | 10/2015 | Chen |
| D748,619 S | 2/2016 | Hsu et al. |
| 2004/0083577 A1 | 5/2004 | Lu et al. |
| 2007/0046635 A1 * | 3/2007 | Nishiyama .............. G06F 1/162 345/168 |
| 2007/0159783 A1 * | 7/2007 | Chen ..................... G06F 1/1616 361/679.27 |

* cited by examiner

*Primary Examiner* — James Wu
*Assistant Examiner* — Hung Q Dang
(74) *Attorney, Agent, or Firm* — Cramer Patent & Design, PLLC; Aaron R. Cramer

(57) ABSTRACT

A notebook computer includes a display screen rotationally attached to the base at a corner thereof. In at least one (1) embodiment, the screen is removably detachable from the base at the attachment point so as to be repositioned and then re-attached.

7 Claims, 6 Drawing Sheets

ROTATABLE DISPLAY SCREEN FOR A NOTEBOOK COMPUTER

RELATED APPLICATIONS

This application claims the benefit of U.S. Provisional Application No. 62/715,603, which was filed Aug. 7, 2018, the entire disclosures of which are incorporated herein by reference.

FIELD OF THE INVENTION

The presently disclosed subject matter is directed to a rotatable display screen for a computing device.

BACKGROUND OF THE INVENTION

As computer technology continues to develop and prices come down, laptop or notebook computers continue to become more prevalent at the office, home and school. Their portability coupled with the same computer power as some desktop computers make them very popular. However, while keyboards, screen, mice and other peripherals can be positioned exactly as one desires on desktop computer systems, notebook computers are limited in their movement as these input and output devices are fixed in position to one another.

While many users just accept these shortcomings, other users such as "garners" who participate in first person games, find such restrictions not only uncomfortable for any extended period of time, but also find that such restrictions impact their ability to play the game, resulting in lower scores. Accordingly, there exists a need for a means by which the screen angle and position for a notebook computer can be positioned in multiple ways not currently feasible with conventional notebook computers. The development of the notebook computer with multi-axis pivoting display fulfills this need.

SUMMARY OF THE INVENTION

The principles of the present invention provide for a notebook computer, comprising a display section which is mechanically and electrically connected to a keyboard section via an articulating arm. The articulating arm is provided with a lower pivoting joint and an upper pivoting joint. The articulating arm works in conjunction with the lower pivoting joint and the upper pivoting joint to allow the display section to be placed in any almost any position desirable to the keyboard section. This enables increased ergonomic functionality of the notebook computer. The notebook computer also comprises a keyboard section which has a keyboard and a graphical input device.

The lower pivoting joint may provide for a first range of motion which is pivotal and allows for 180 degrees of motion. The lower pivoting joint may also provide for a second range of motion which is pivotal and allows for 360 degrees of motion. The upper pivoting joint may provide for a third range of motion which is pivotal and allows for 360° degrees of motion. The articulating arm may be displayed in an upright configuration with the upper pivoting joint having a rotational bearing assembly with a 360° degree bearing surface. The rotational bearing assembly may be provided with an interior pass-through opening which allows for an interconnecting cabling to and from the display section. The interconnecting cabling may carry one or more video signals, one or more power signals, or one or more graphical positioning signals.

The articulating arm may be formed as an integral component of the rotational bearing assembly in a unitary configuration. The articulating arm may be attached as a separate component via welding, adhesive, or one or more physical fasteners. The articulating arm may also be provided with a first electrical connector while the display section is provided with a second electrical connector. The display section may be held by a plurality of first mechanical couplers which are provided on the articulating arm and which correspond to a plurality of second mechanical couplers on the display section. The first mechanical couplers may be disengaged by activation of release on a forward face of the articulating arm.

The first mechanical couplers may each be provided with a retractable coupler which engage the second mechanical couplers. The first electrical connector may be provided with a plurality of contacts as are necessary to carry each of a corresponding electrical signal as are carried by the interconnecting cabling when the first electrical connector is mated with the second electrical connector. The graphical input device may be a trackpad.

The notebook computer may further comprise an additional device selected from the group consisting of a processor, a memory, a data storage mechanism, an input port, an output port, a control switch, a sensor, a battery, a power supply, a cooling mechanism, a mechanical latch, or a mechanical structural device. The keyboard section may be placed left of a user, facing outward on a desk, while the display section is moved closer to the face of the user, thereby providing a more immersive experience. The notebook computer may be selected from the group consisting of a low-cost budget notebook computer, a business enterprise notebook computer, a gaming notebook computer, a heavy-duty industrial grade notebook computer, or a military grade notebook computer.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
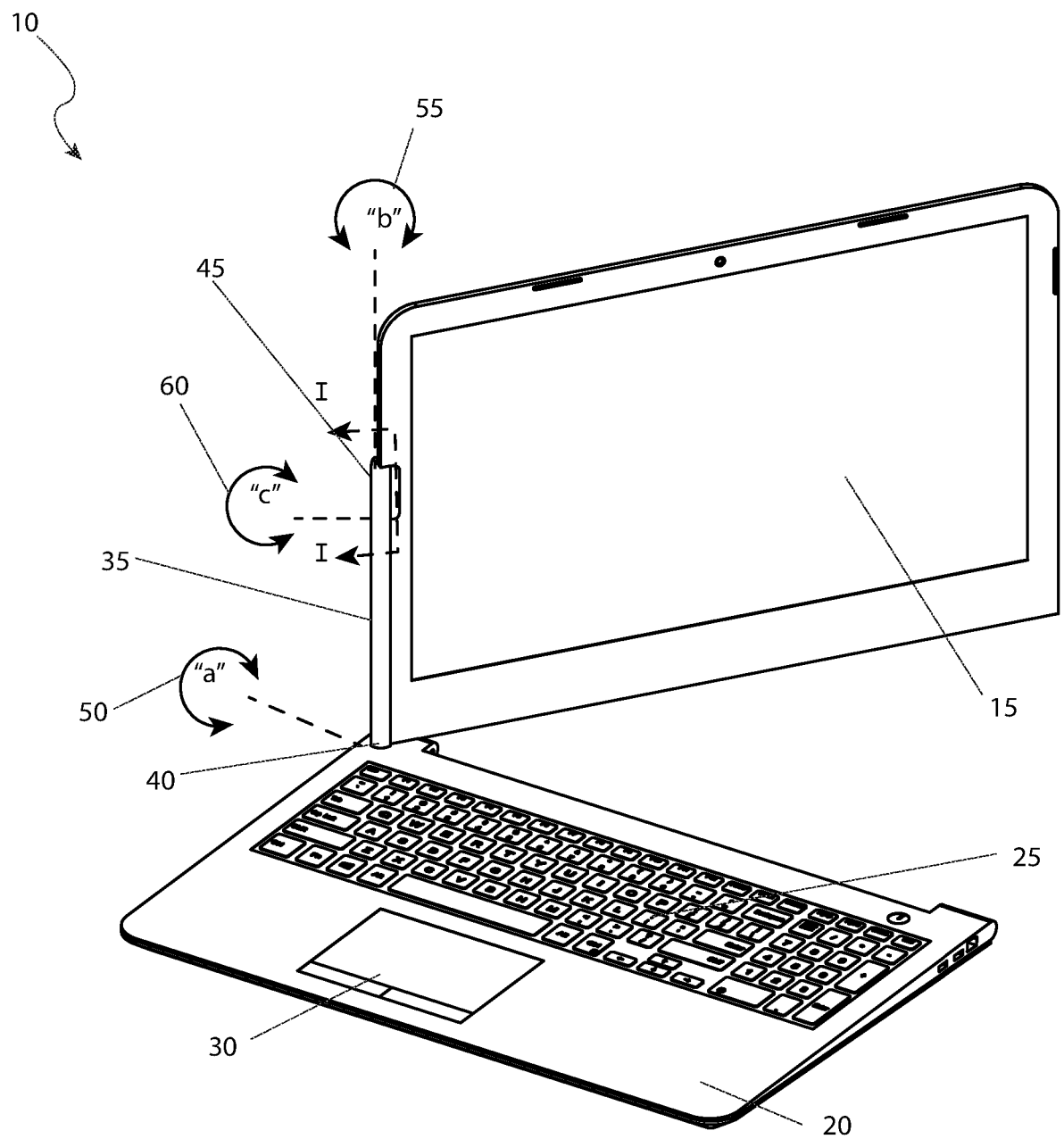
FIG. 1 is a perspective view of the notebook computer with multi-axis pivoting display 10, in an open state, according to the preferred embodiment of the present invention.

10 notebook computer
15 display section 20 keyboard section
25 keyboard
30 graphical input device
35 articulating arm
40 lower pivoting joint
45 upper pivoting joint
50 first range of motion "a"
55 second range of motion "b"
60 third range of motion "c"
65 input/output port
70 rotational bearing assembly
75 bearing surface
80 interior pass-through opening
85 interconnecting cabling
90 first electrical connector
95 second electrical connector
100 first mechanical coupler
105 second mechanical coupler
110 release
115 retractable coupler
120 travel path "p"
125 multiple contact 1. Description of the Invention The best mode for carrying out the invention is presented in terms of its preferred embodiment, herein depicted within FIGS. 1 through 6. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

2. Detailed Description of the Figures

Referring now to FIG. 1, a front view of the notebook computer 10 with multi-axis pivoting display, according to the preferred embodiment of the present invention is disclosed. The notebook computer 10 (herein also described as the "device") 10, includes a display section 15 and a keyboard section 20. The keyboard section 20 would possess both a keyboard 25 and a graphical input device 30, such as a trackpad. It is noted that other interior and exterior devices included but not limited to: processors, memory, data storage mechanisms, input ports, output ports, control switches, sensors, batteries, power supplies, cooling mechanisms, mechanical latches, mechanical structural devices, and the like would be provided as part of either the display section 15 and/or the keyboard section 20, whose inclusion is necessary for the overall functionality of the device 10. However, said devices are beyond the scope of the current teachings, and thus are not intended to limit the present invention. Additionally, various parameters such as the size of the display section 15, operating system, performance parameters, and the like, are also not limited by the scope of the present invention. The teachings of the present invention can be incorporated into low cost budget notebook computers, business enterprise notebook computers, gaming notebook computers, heavy duty industrial or military grade notebook computers, or the like.

The display section 15 is mechanically and electrically connected to the keyboard section 20 via an articulating arm 35. The articulating arm 35 is provided with a lower pivoting joint 40 and an upper pivoting joint 45. The lower pivoting joint 40 provides for a first range of motion "a" 50, which is pivotal in nature and allows for approximately one hundred eighty degrees (180°) of motion. It also provides for a second range of motion "b" 55, also pivotal in nature and allows for approximately three hundred sixty degrees (360°) of motion. Next, the upper pivoting joint 45 provides for a third range of motion "c" 60, which is pivotal in nature and allows for approximately three hundred sixty (360°) of motion. As such, the articulating arm 35, working in conjunction with the lower pivoting joint 40 and the upper pivoting joint 45, allow the display section 15 to be placed in any almost any position desirable to the keyboard section 20, thus increasing the overall ergonomic functionality of the device 10. One (1) possible benefit of the functionality is to place the keyboard section 20 to the left of the user, facing outward on a desk, while the display section 15 is moved closer to the face of the user, thus providing a more immersive experience, envisioned to be valued in game playing such as first-person player games.

Figure 2:
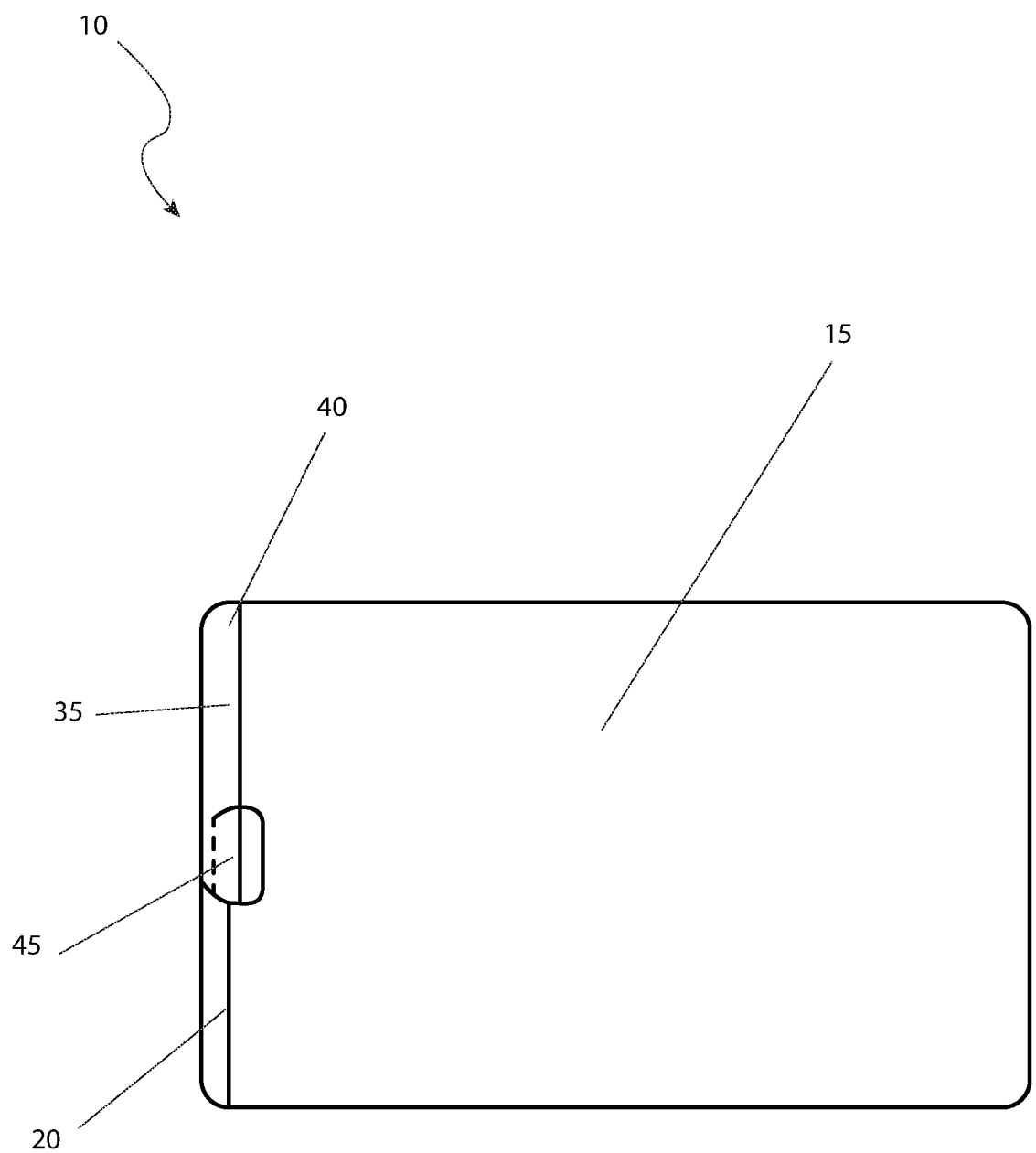
FIG. 2 is a top view of the notebook computer with multi-axis pivoting display 10, in a closed state, according to the preferred embodiment of the present invention.

Referring next to FIG. 2, a top view of the device 10, in a closed state, according to the preferred embodiment of the present invention is depicted. This view clearly depicts the display section 15, the keyboard section 20, the articulating arm 35, the lower pivoting joint 40, and the upper pivoting joint 45. The closed configuration allows for storage and transport of the device 10 while it occupies a minimal overall volume, not unlike a conventional notebook computer.

Figure 3:
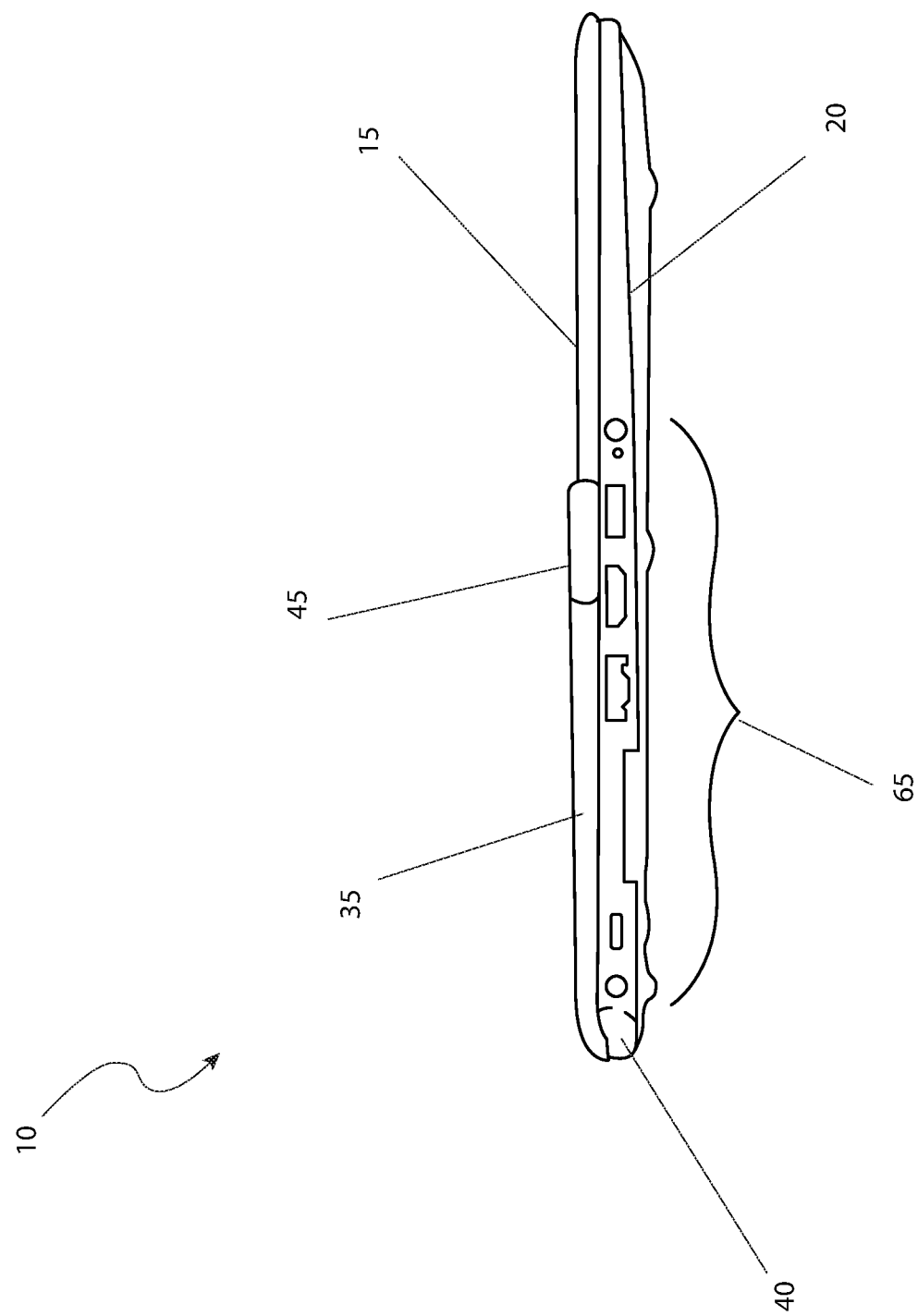
FIG. 3 is a side view of the notebook computer with multi-axis pivoting display 10, in a closed state, according to the preferred embodiment of the present invention.

Referring now to FIG. 3, a side view of the device 10, in a closed state, according to the preferred embodiment of the present invention is shown. As with FIG. 2, the present view clearly depicts the display section 15, the keyboard section 20, the articulating arm 35, the lower pivoting joint 40, and the upper pivoting joint 45. Also visible is various input/output ports 65, as would customarily be expected. Also, the lower pivoting joint 40 is envisioned to be similar to conventional fixed or pivoting hinges found on conventional notebook computers with pass through cabling.

Figure 4:
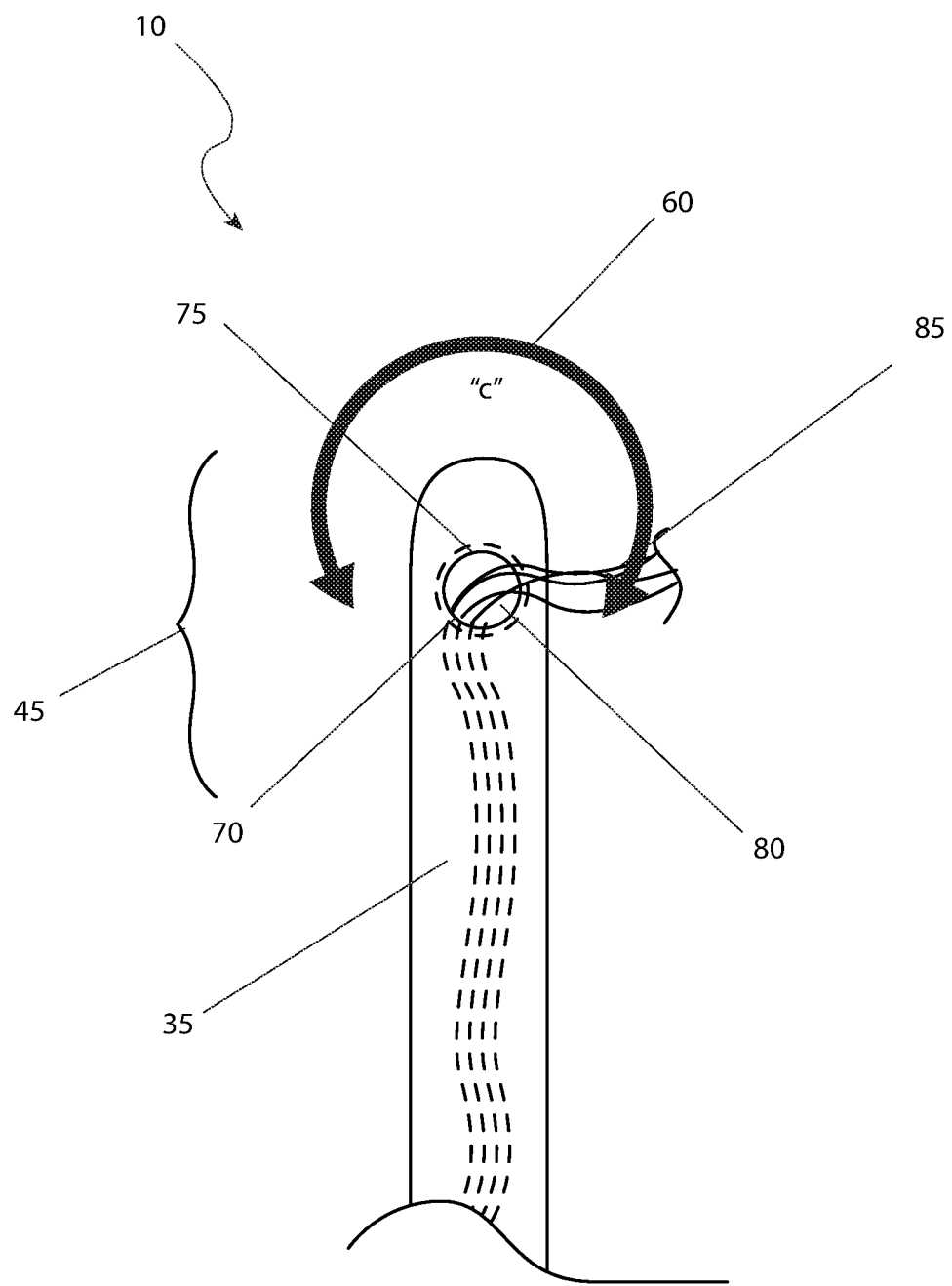
FIG. 4 is a sectional view of the notebook computer with multi-axis pivoting display 10, as seen along a line I-I, as shown in FIG. 1, according to the preferred embodiment of the present invention.

Referring next to FIG. 4, a sectional view of the device 10, as seen along a line I-I, as shown in FIG. 1, according to the preferred embodiment of the present invention is disclosed. The articulating arm 35 is displayed in an upright configuration with the upper pivoting joint 45 having a rotational bearing assembly 70 with a three hundred sixty degree (360°) bearing surface 75 formed as either an integral component of the rotational bearing assembly 70 in a unitary configuration or attached as a separate component via welding, adhesive, physical fasteners, or the like. The rotational bearing assembly 70 is provided with an interior pass-through opening 80 which allows for interconnecting cabling 85 to and from the display section 15 (as shown in FIG. 1). The interconnecting cabling 85 would carry video signals, power signals, graphical positioning signals (in the instance of touch sensitive display screens, along with audio signals, web cam signals, and the like depending on the specific configuration of the device 10. Due to the central nature of the interior pass-through opening 80, minimal stress is exerted on the interconnecting cabling 85 during motion defined by the third range of motion "c" 60, thus allowing for long life.

Figure 5:
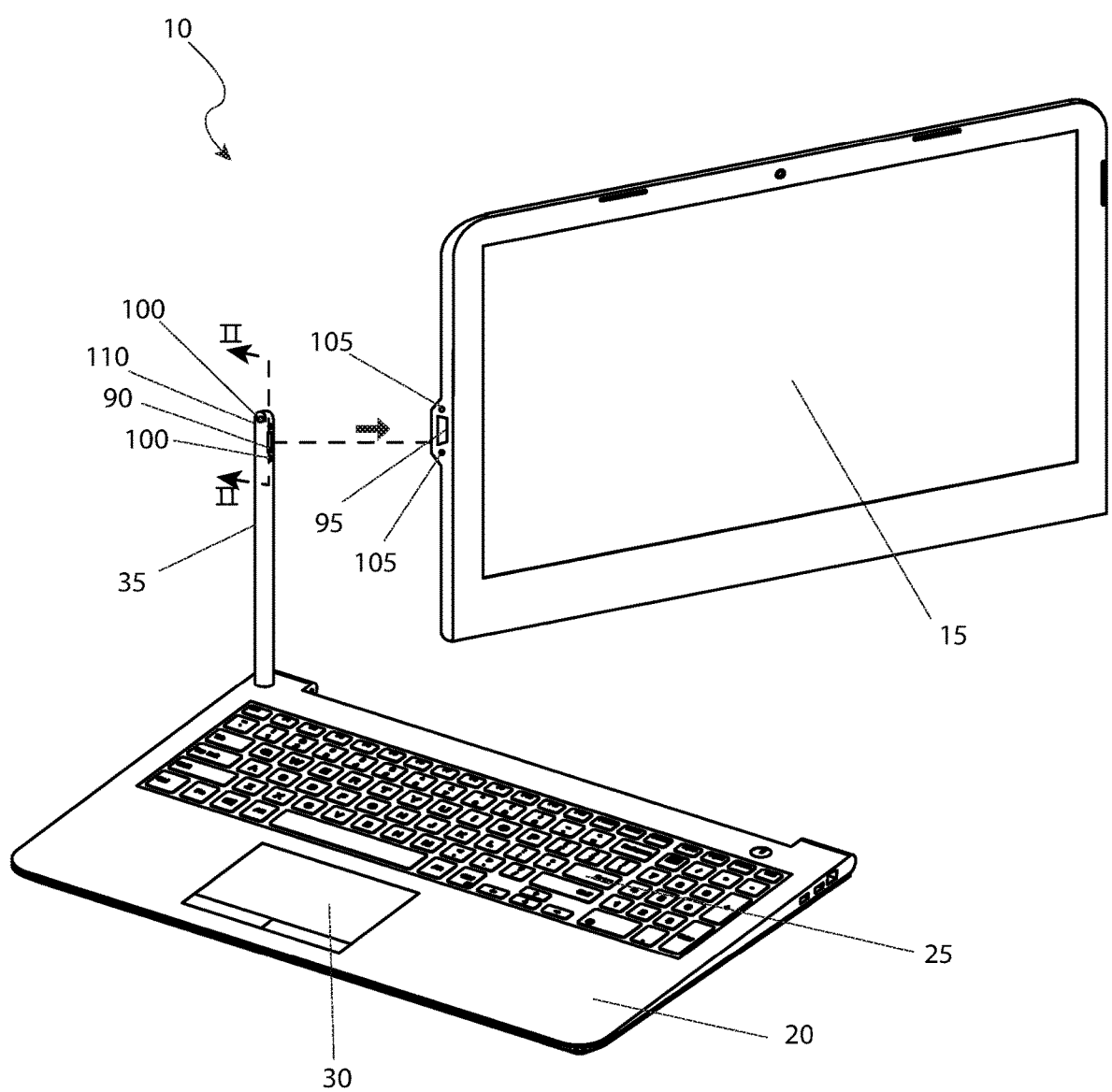
FIG. 5 is a perspective view of the notebook computer with multi-axis pivoting display 10, shown in a utilized state, according to a first alternate embodiment of the present invention; and, FIG. 6 is a sectional view of the notebook computer with multi-axis pivoting display 10, as seen along a line II-II, as shown in FIG. 5, according to the first alternate embodiment of the present invention.

Referring now FIG. 5, a perspective view of the device 10, shown in a utilized state, according to a first alternate embodiment of the present invention is depicted. This first alternate embodiment allows for removal or separation of the display section 15 from the keyboard section 20 as shown. Such operation is typical as found in modern notebook computers which allows the display section 15 to function as a "tablet" computer, where all input control is made via a touchscreen. As such, all necessary computing devices included, but not limited to: processors, memory, batteries, input devices, output devices, and the like are self-contained within the display section 15. When attached to the keyboard section 20, other components such as the keyboard 25, the graphical input device 30, and auxiliary computing devices such as additional input ports, output ports, storage devices, and the like are automatically connected.

The articulating arm 35 is provided with a first electrical connector 90 while the display section 15 is provided with an appropriate second electrical connector 95. To physically hold the display section 15, at least two (2) first mechanical couplers 100 are provided on the articulating arm 35 which correspond to at least two (2) second mechanical couplers 105 on the display section 15. The first mechanical couplers 100 are disengaged by the activation of a release 110 on the forward face of the articulating arm 35. Further definition of the first electrical connector 90 and first mechanical couplers 100 will be provided herein below. It is noted that the third range of motion "c" 60 (as shown in FIG. 1) may or may not be retrained in the first alternate embodiment by incorporation of a lower pivoting joint 40 (as shown in FIG. 1) in either the articulating arm 35 or the display section 15.

Figure 6:
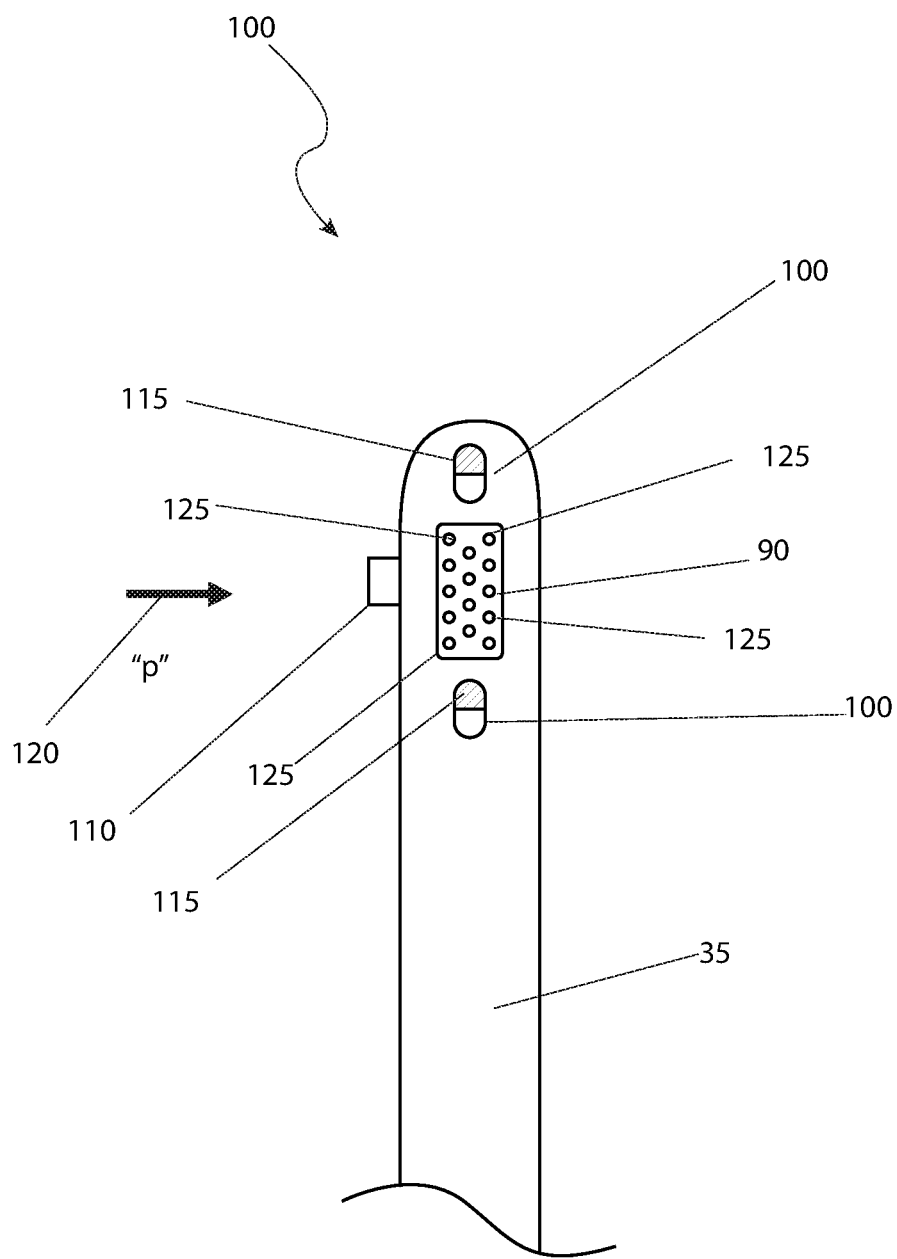

Referring to FIG. 6, a sectional view of the device 10, as seen along a line II-II, as shown in FIG. 5, according to the first alternate embodiment of the present invention is shown. This view provides clearer indication of the first electrical connector 90 and the first mechanical couplers 100. The first mechanical couplers 100 are each provided with a retractable coupler 115 which engage the second mechanical couplers 105 (as shown in FIG. 5). The release 110 in a preferred embodiment is a pushbutton. When the release 110 is pressed along a travel path "p" 120, the retractable couplers 115 retract allowing for a disengagement of the display section 15 (as shown in FIG. 5). Additionally, the first electrical connector 90 is provided with multiple contacts 125 as necessary to carry the corresponding electrical signals as carried by the interconnecting cabling 85 (as shown in FIG. 4), when the first electrical connector 90 is mated with the second electrical connector 95.

3. Operation of the Preferred Embodiment

The preferred embodiment of the present invention can be utilized by the common user in a simple and effortless manner with little or no training. It is envisioned that the device 10 would be constructed in general accordance with FIG. 1 through FIG. 6. The user would procure the device 10 through normal procurement channels while selecting the desired operating parameters such as screen size, battery life, operating system, memory, data storage, and the like.

During utilization of the device 10, the following procedure would be initiated: the display section 15 would be lifted upward from the keyboard section 20, utilizing the lower pivoting joint 40 along the first range of motion "a" 50; the display section 15 is then pivoted using the lower pivoting joint 40 along the second range of motion "b" 55; finally, the display section 15 is pivoted with respect to the articulating arm 35 along the third range of motion "c" 60 with minor adjustments made to provide the best viewing experience. Operation then proceeds in a manner typical to that of a conventional notebook computer.

In the case of the first alternate embodiment, the display section 15 may be separated from the keyboard section 20 by grasping the display section 15 in one hand, while pressing the release 110 with the other to disengage the display section 15 for standalone tablet operation.

After use of the device 10, the above-mentioned ranges of motion are reversed to close the device 10 as is depicted in FIGS. 2 and 3, to allow for storage and transport.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A notebook computer, comprising:
a display section mechanically and electrically connected to a keyboard section via a single articulating arm, the single articulating arm is provided with a single lower pivoting joint and a single upper pivoting joint, the single articulating arm working in conjunction with the single lower pivoting joint and the single upper pivoting joint to allow the display section to be placed in any almost any position desirable to the keyboard section, thus increasing the overall ergonomic functionality of the notebook computer;
wherein the keyboard section includes a keyboard and a graphical input device;
wherein the single articulating arm is formed as an integral component of a rotational bearing assembly in a unitary configuration;
wherein the single articulating arm is attached as a separate component via welding, adhesive, or one or more physical fasteners;
wherein an interconnecting cabling carry one or more video signals, one or more power signals, or one or more graphical positioning signals;
wherein the first electrical connector is provided with a plurality of contacts as necessary to carry each of a corresponding electrical signal as carried by the interconnecting cabling when a first electrical connector is mated with a second electrical connector; and
wherein the single upper pivoting joint provides for a third range of motion which is pivotal and allows for 360° degrees of motion.

2. The notebook computer according to claim 1, wherein the graphical input device is a trackpad.

3. The notebook computer according to claim 1, further comprising an additional device selected from the group consisting of a processor, a memory, a data storage mechanism, an input port, an output port, a control switch, a sensor, a battery, a power supply, a cooling mechanism, a mechanical latch, or a mechanical structural device.

4. The notebook computer according to claim 1, wherein the keyboard section is placed left of a user, facing outward on a desk, while the display section is moved closer to the face of the user, thereby providing a more immersive experience.

5. The notebook computer according to claim 1, wherein the notebook computer is selected from the group consisting of a notebook computer, a business enterprise notebook computer, a gaming notebook computer, a heavy duty industrial grade notebook computer, or a military grade notebook computer.

6. The notebook computer according to claim 1, wherein the single articulating arm is displayed in an upright configuration with the single upper pivoting joint having a rotational bearing assembly with a 360° degree bearing surface.

7. The notebook computer according to claim 1, wherein the first mechanical couplers are disengaged by activation of a release on a forward face of the single articulating arm and the first mechanical couplers are each provided with a retractable coupler which engage the second mechanical couplers.

* * * * *